(12) United States Patent
Fang et al.

(10) Patent No.: US 9,164,638 B2
(45) Date of Patent: Oct. 20, 2015

(54) INFORMATION PROCESSING METHOD AND DEVICE FOR ELECTRONIC DEVICE WITH TOUCH SCREEN

(75) Inventors: Wen Fang, Shenzhen (CN); Feng Guo, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 53 days.

(21) Appl. No.: 14/123,177

(22) PCT Filed: Sep. 15, 2011

(86) PCT No.: PCT/CN2011/079698
§ 371 (c)(1),
(2), (4) Date: Nov. 29, 2013

(87) PCT Pub. No.: WO2012/174797
PCT Pub. Date: Dec. 27, 2012

(65) Prior Publication Data
US 2014/0092067 A1    Apr. 3, 2014

(30) Foreign Application Priority Data

Jun. 23, 2011    (CN) .......................... 2011 1 0171515

(51) Int. Cl.
G06F 3/045    (2006.01)
G06F 3/044    (2006.01)
(Continued)

(52) U.S. Cl.
CPC ............... *G06F 3/044* (2013.01); *G06F 3/038* (2013.01); *G06F 3/03542* (2013.01); *G06F 3/03545* (2013.01); *G06F 3/0416* (2013.01)

(58) Field of Classification Search
CPC ....... G06F 3/038; G06F 3/0416; G06F 3/044; G06F 3/03542; G06F 3/03545
USPC ................... 345/173–184; 178/18.01–18.07, 178/19.01–19.07
See application file for complete search history.

(56) References Cited

U.S. PATENT DOCUMENTS 5,027,115 A * 6/1991 Sato et al. ........................ 341/13
5,247,137 A * 9/1993 Epperson ................... 178/19.04
(Continued)

FOREIGN PATENT DOCUMENTS

CN    1604120 A    4/2005
CN    101246413 A    8/2008
(Continued)

OTHER PUBLICATIONS

International Search Report in international application No. PCT/CN2011/079698, mailed on Mar. 15, 2012.
(Continued)

*Primary Examiner* — Vijay Shankar
(74) *Attorney, Agent, or Firm* — Oppedahl Patent Law Firm LLC

(57) ABSTRACT

The disclosure discloses an information processing method for an electronic device with a touch screen. The method includes: touch with a touch screen is detected; an information pickup area is set on the touch screen according to the touch; and information in the information pickup area is picked up according to an information pickup command and the picked-up information is stored. In the disclosure, existing information, such as an image or a signature, is picked up via an information processing device, such as a stylus, on a touch screen of an electronic device; and a user can autonomously control its image, signature and other information to display on the touch screen of the electronic device when needed. Therefore, great convenience is brought to users using a portable electronic device such as a tablet PC and a smart phone, and their personalized application can also be met to a great extent.

17 Claims, 7 Drawing Sheets

(51) Int. Cl.
*G06F 3/038* (2013.01)
*G06F 3/041* (2006.01)
*G06F 3/0354* (2013.01)

(56) References Cited

U.S. PATENT DOCUMENTS

| | | | |
|---|---|---|---|
| 5,294,792 A * | 3/1994 | Lewis et al. | 250/221 |
| 5,526,023 A * | 6/1996 | Sugimoto et al. | 345/173 |
| 5,548,092 A * | 8/1996 | Shriver | 178/19.01 |
| 5,581,783 A * | 12/1996 | Ohashi | 710/5 |
| 5,850,058 A * | 12/1998 | Tano et al. | 178/18.01 |
| 6,002,387 A * | 12/1999 | Ronkka et al. | 345/157 |
| 6,084,577 A * | 7/2000 | Sato et al. | 345/179 |
| 6,188,392 B1 | 2/2001 | O'Connor et al. | 345/179 |
| 6,486,875 B1 * | 11/2002 | O'Donnell, Jr. | 345/179 |
| 6,563,494 B1 * | 5/2003 | Eichstaedt et al. | 345/179 |
| 6,573,887 B1 * | 6/2003 | O'Donnell, Jr. | 345/179 |
| 7,756,332 B2 * | 7/2010 | Jager | 382/173 |
| 8,493,333 B2 * | 7/2013 | Kang et al. | 345/173 |
| 2005/0041860 A1 | 2/2005 | Jager | |
| 2008/0192020 A1 | 8/2008 | Kang et al. | |

FOREIGN PATENT DOCUMENTS

| | | |
|---|---|---|
| CN | 101620502 A | 1/2010 |
| JP | 2005071349 A | 3/2005 |
| KR | 100785071 B1 | 12/2007 |
| WO | 2010016717 A2 | 2/2010 |

OTHER PUBLICATIONS

English Translation of the Written Opinion of the International Search Authority in international application No. PCT/CN2011/079698, mailed on Mar. 15, 2012.

* cited by examiner

INFORMATION PROCESSING METHOD AND DEVICE FOR ELECTRONIC DEVICE WITH TOUCH SCREEN

TECHNICAL FIELD

The disclosure relates to technology for portable electronic devices, in particular to an information processing method and device for an electronic device with a touch screen.

BACKGROUND

At present, there are two common schemes in the handwriting input field of mobile terminals: input via a resistive touch screen and input via a capacitive touch screen.

An input principle of the resistive touch screen is: when a corresponding stylus is adopted for writing on such touch screen, a part where the stylus touches the touch screen may deform due to the change of a touch pressure between the stylus and the touch screen, so that the resistance of this point is changed to implement touch input of the resistive touch screen. The resistive touch screen is characterized in that it has no particular requirement on the stylus and a relatively low cost but it cannot support identification of multi-point touch. At present, the resistive touch screen is applied to a large number of middle-end and low-end mobile phones with touch screens.

An input principle of the capacitive touch screen is: a capacitive sensing device is built in the screen to form an inductance with a charged object which gets close enough to the capacitive sensing device, and the capacitive sensing device absorbs partial inductive charge through the inductance, and determines a specific touch operation location by detecting the row and column where the absorbed inductive charge is located. The capacitive touch screen can support the multi-point touch but has a certain requirement on an input medium. Generally, only a charged object can implement input. For example, the input medium is generally a finger of a person. But now, some techniques for handwriting input on the capacitive touch screen using a special stylus also appear.

Along with the emergence of high-end mobile terminal products such as tablet Personal Computers (PCs) and smart phones, the mobile terminal is increasingly becoming an important tool for daily record and writing of people. Therefore, people propose an increasingly strict requirement on each function of the mobile terminal. For example, for such product as a tablet PC or a smart phone with a large screen, people hope to utilize its accessary stylus to implement more functions besides existing text control and writing functions of the stylus, for example utilizing the stylus to implement a function like paper writing on the screens of these mobile terminals, such as drawing, signature and stamping. However, there is still no such technology in the related art.

SUMMARY

The disclosure is desired to provide an information processing method and device for an electronic device with a touch screen.

A purpose of the disclosure is implemented by the following technical solutions.

An information processing method for an electronic device with a touch screen includes:
touch with a touch screen is detected;
an information pickup area is set on the touch screen according to the touch; and
information in the information pickup area is picked up according to an information pickup command and the picked-up information is stored.

Preferably, the method may further include: after the picked-up information is stored,
touch with the touch screen is detected;
an information display area is set on the touch screen according to the touch; and
information corresponding to an information input command is fetched from the electronic device, and the information is displayed in the information display area.

Preferably, the information in the information pickup area may be image information.

More preferably, the method may further include: before the picked-up information is stored, image pre-processing is performed on the image information.

More preferably, the image pre-processing may include more than one of followings: image compression processing, image binarization processing, gray level processing on an image and edge-directed image processing.

An electronic device includes: a touch screen, a touch detection module, an information pickup area setting module, an information pickup module and a storage module, wherein
the touch detection module is configured to detect touch with the touch screen;
the information pickup area setting module is configured to set an information pickup area on the touch screen according to the touch;
the information pickup module is configured to pick up information in the information pickup area according to an information pickup command and store the picked-up information; and
the storage module is configured to store the picked-up information.

Preferably, the electronic device may further include: an information display module, configured to fetch information corresponding to an information input command from the electronic device and display the information in the information display area.

Preferably, the electronic device may further include: an image pre-processing module, which is connected between the information pickup module and the storage module and is configured to pre-process image information, in order to store the acquired information to the storage module by the information pickup module.

An information processing method for an electronic device with a touch screen, includes:
touch with a touch screen is detected;
an information pick-up area is set on the touch screen according to the touch;
information in the information pickup area is picked up according to an information pickup command; and
the picked-up information is transmitted to an information processing device.

Preferably, the method may further include: after the picked-up information is transmitted to the information processing device,
touch with the touch screen is detected;
an information display area is set on the touch screen according to the touch;
information is received from the information processing device; and
the received information is displayed in the information display area.

Preferably, the information in the information pickup area may be image information.

More preferably, the method may further include: before the picked-up information is stored, image pre-processing is performed on the image information.

More preferably, the image pre-processing may include more than one of followings: image compression processing, image binarization processing, gray level processing on an image and edge-directed image processing.

An electronic device includes: a touch screen, a touch detection module, an information pickup area setting module, an information pickup module and an information transmission module, wherein the touch detection module is configured to detect touch with the touch screen;

the information pickup area setting module is configured to set an information pickup area on the touch screen according to the touch;

the information pickup module is configured to pick up information in the information pickup area according to an information pickup command; and the information transmission module is configured to transmit the picked-up information to the information processing device.

Preferably, the electronic device may further include: a storage module, which is connected with the information pickup module and is configured to store the picked-up information.

More preferably, the electronic device may further include: an information display module, configured to acquire information corresponding to an information input command from the information processing device and display the information in the information display area.

More preferably, the electronic device may further include: an image pre-processing module, which is connected between the information pickup module and the storage module and is configured to pre-process an image, in order to store the acquired information to the storage module by the information pickup module.

Preferably, the information transmission module may be a capacitance detection device which exchanges information with an electric field output circuit of the information processing device.

An information processing device for an electronic device with a touch screen includes: a power module, a command input module, a control module, a transmission module and a storage module, wherein the power module is configured to supply power for the command input module, the control module, the transmission module and the storage module;

the command input module is configured to input a user command;

the control module is configured to control the transmission module and the storage module in response to and in accordance with the user command;

the transmission module is configured to exchange information with the electronic device under control of the control module; and the storage module is configured to store the information.

Preferably, the transmission module may include: a data interface, configured to acquire information from the electronic device.

More preferably, the transmission module may further include: an electric field output circuit, configured to exchange information with a capacitance detection device of the electronic device.

More preferably, the transmission module may further include: a pixel output unit, configured to transmit the information exchanged with the capacitance detection device in a serial data transmission way or a parallel data transmission way.

It can be seen from the technical scheme of embodiments of the disclosure that, in the disclosure, existing information, such as an image or a signature, is picked up via an information processing device, such as a stylus, on a touch screen of an electronic device; and a user can autonomously control its image, signature and other information to display on the touch screen of the electronic device when needed. Therefore, great convenience is brought to users using a portable electronic device such as a tablet PC and a smart phone, and their personalized application can also be met to a great extent. The disclosure can be applied to but is not limited to the following aspects: 1. taking notes for a student; 2. marking text contents on a tablet PC for a white-collar worker in a meeting; and 3. marking special contents for students during projector presentation using a tablet product, and other scenarios. Therefore, the disclosure has a great application value.

DETAILED DESCRIPTION

The technical solution of the disclosure is further elaborated below with reference to the drawings and specific embodiments, in order to enable those skilled in the art to better understand and implement the disclosure, but the disclosure is not limited by recited embodiments.

An information processing method for an electronic device with a touch screen provided by some embodiments of the disclosure is divided into an information pickup process and an information display process during implementation. Here, the information display process can also be referred to as an information input process. In the embodiments, the information generally refers to image information, a pickup process of image information refers to a process of picking up an image or signature displayed on a screen of an electronic device and saving the picked-up data, and an input process of image information refers to a process of selecting a proper location on a screen of an electronic device through an information processing device to directly spray saved image information, such as an image or a signature, to the location as a marker.

Here, it should be noted that the electronic device in the text generally refers to but is not limited to: a tablet PC, a mobile phone, a Personal Digital Assistant (PDA) and the like and that the information processing device in the text refers to a device, such as a stylus, used in conjunction with the tablet PC, the mobile phone or the PDA. The spirit of the disclosure will be elaborated by means of a stylus in the embodiments of the disclosure.

Figure 1:
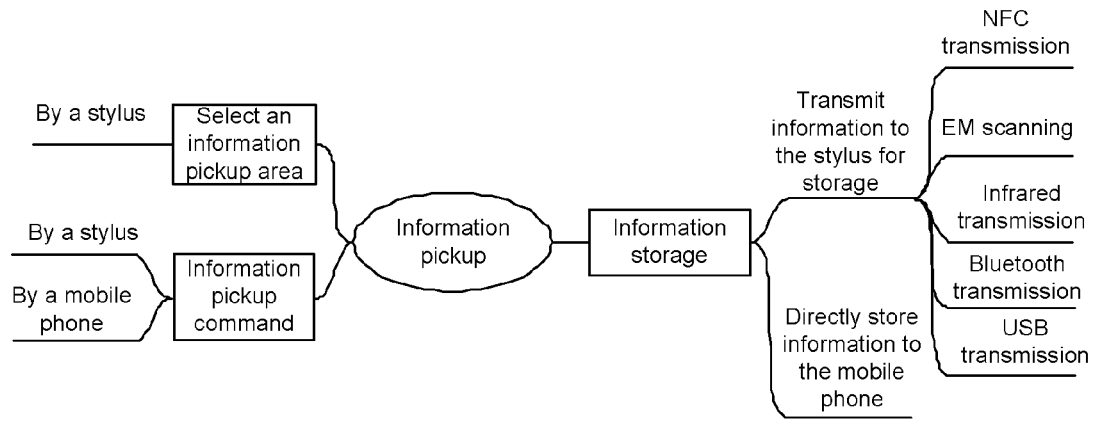
FIG. 1 is a schematic diagram showing image information pickup implemented by a stylus in an embodiment of the disclosure.

FIG. 1 is a schematic diagram showing image information pickup implemented by a stylus in an embodiment of the disclosure. With reference to FIG. 1, a device for sending an information pickup command may be a stylus or an electronic device. An information pickup area needs to be selected by the stylus, and after image information in the information pickup area is picked up by the electronic device, the electronic device can store the image information in the following two ways:

1. the image information is transmitted to the stylus for storage by Electron Microscopy (EM) scanning, infrared transmission, Bluetooth transmission, a Universal Serial Bus (USB) and in other transmission ways; and 2. the image information is directly stored to the electronic device.

However, no matter which storage way is adopted, before the image information is stored, image pre-processing can be performed on the image information, such as compression processing, binarization processing, grey level processing and edge processing, in order to reduce data volume for storage and transmission and speed up operation response.

Figure 2:
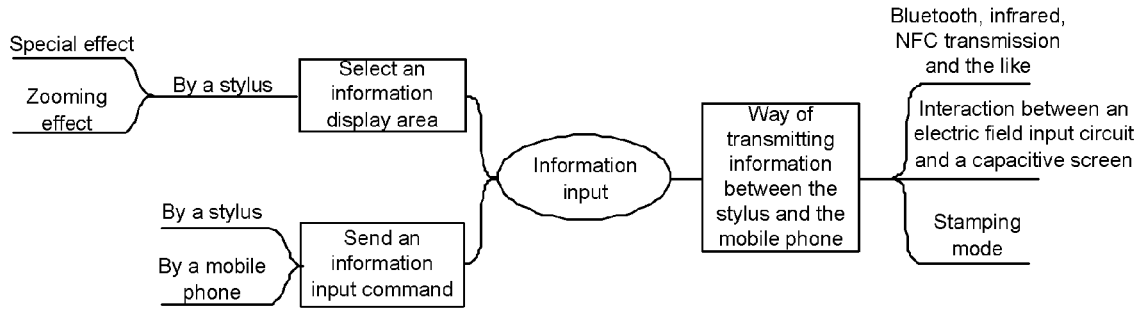
FIG. 2 is a schematic diagram showing image input implemented by a stylus in an embodiment of the disclosure.

FIG. 2 is a schematic diagram showing image input implemented by a stylus in an embodiment of the disclosure. Likewise, a device for sending an information input command may be a stylus, or an electronic device, such as a mobile phone. When a user selects an information displaying area on a screen of an electronic device through the stylus, image information interested by the user will be displayed in the information displaying area. It should be noted that, with reference to FIG. 2, when the image information is stored in the stylus by the aforementioned storage ways, the image information firstly needs to be transmitted from the stylus to the electronic device by a transmission way of followings: Bluetooth transmission, infrared transmission and Near Field Communication (NFC) transmission, or by a way of exchanging information between an electric field output circuit and the capacitive screen or the touch screen of the electronic device, or by a stamping way. Wherein, the stamping way will be elaborated below.

Figure 3:
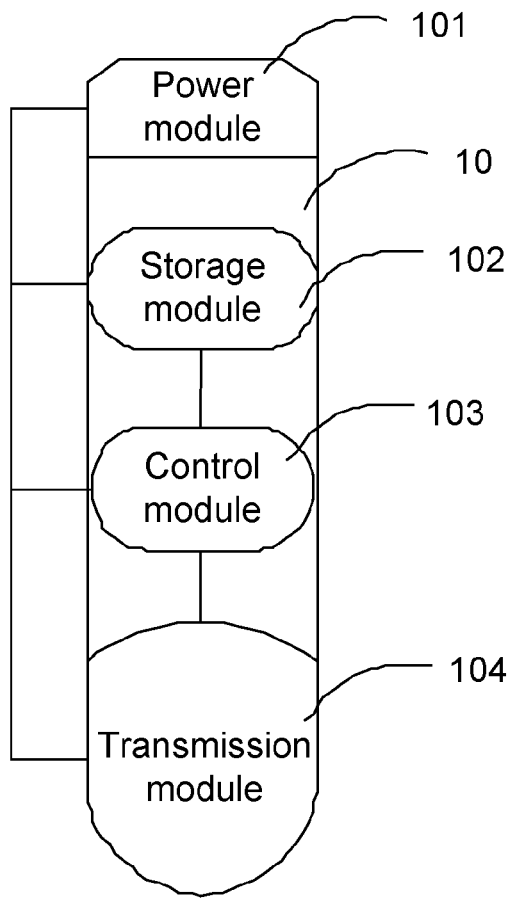
FIG. 3 is a schematic diagram showing a structure of a stylus provided by an embodiment of the disclosure.

FIG. 3 is a schematic diagram showing a structure of a stylus provided by an embodiment of the disclosure. As shown in FIG. 3, the whole stylus internally includes: a power module 101, a transmission module 104, a storage module 102 and a control module 103, wherein the power module 101 is configured to supply power for a normal operation of other all modules, which can be implemented via a build-in battery or an external charging connection;

the transmission module 104 is configured to: acquire image data to be picked up from an electronic device and forward the image data to the storage module 102; or transmit image information data stored in the storage module 102 to the electronic device via the control module 103; and the storage module 102 is configured to: store the image information data in the stylus; and input the image information data into the stylus 10 in cooperation with the transmission module 104 under the control of the control module 103, or output the image information data in the stylus 10 to the electronic device in cooperation with the transmission module 104 under the control of the control module 103.

Of course, the stylus 10 further includes an input stylus nib which has a normal input structure of the stylus 10. In an embodiment of the disclosure, the input stylus nib can serve as capturing or selecting an image on a screen of an electronic device and outputting the image to a specified location of the screen of the electronic device.

Figure 4:
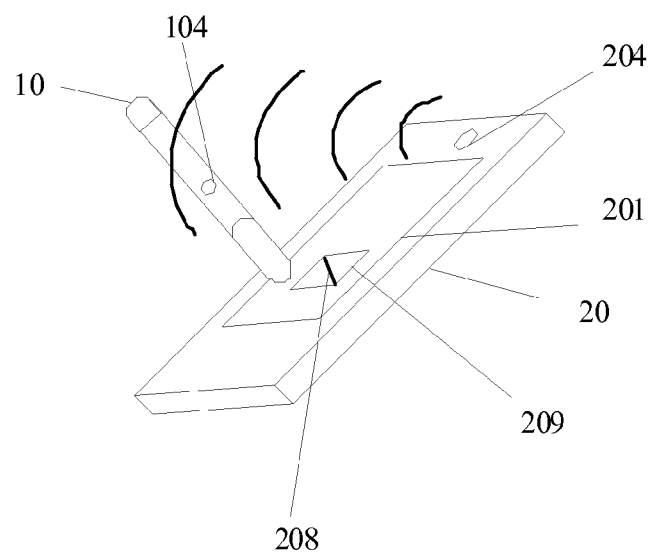
FIG. 4 is a schematic diagram showing of operation of image information pickup implemented by a stylus provided by an embodiment of the disclosure.

FIG. 4 is a schematic diagram showing an operation of image information pickup implemented by a stylus provided by an embodiment of the disclosure. According to FIG. 4, a corresponding image pickup process is as follows.

A user operates a mobile terminal 20 to enter an image pickup mode.

The user utilizes a stylus 10 to operate on the screen 201 of an electronic device 20 to draw a stylus operation line 208, which is taken as a diagonal line to form a rectangular area by the mobile terminal; and the electronic device 20 sets the rectangular area as an information pickup area 209. Of course, the information pickup area 209 can be set in various ways, for example, the user can delineate an interested area through the stylus 10 to take the delineated area as an information pickup area, or the user can set an information pickup area in an information pickup way based on image processing. The aforementioned setting method is not limited here.

The electronic device 20 stores image information data in the information pickup area 209, with the advantages as follows: (1) the transmission module 104 of the stylus 10 can be omitted to reduce a cost to some extent; and (2) the electronic device 20 can store more image information due to its larger storage capacity, so that a user can select image information according to a specific application scenario. However, directly storing image information to the electronic device 20 also has the following problems: (1) a selection-and-operation process implemented by the user on the electronic device 20 is relatively complicated; and (2) the stylus 10 cannot sign or mark like this on other electronic devices 20, so as to narrow an application range to users.

Furthermore, image information can be also transmitted to the transmission module 104 of the stylus 10 through an information transmission module of the electronic device 20; and after the image information is received by the stylus, the stylus stores image information data, so as to solve the aforementioned two problems.

Figure 5:
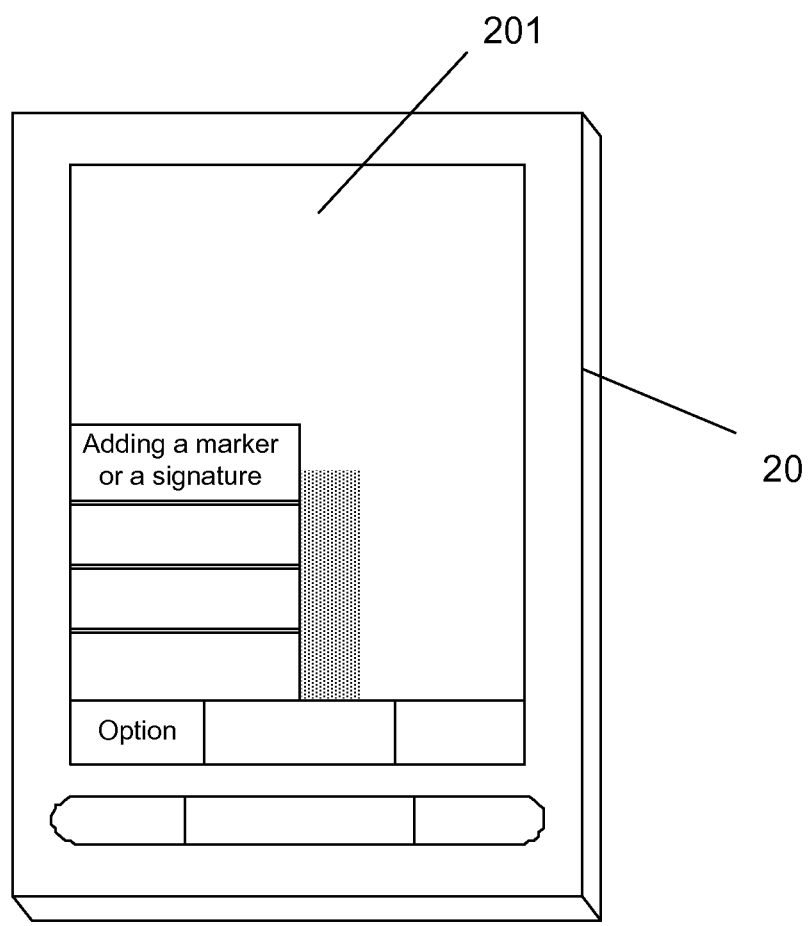
FIG. 5 is a schematic diagram showing an operation of image information input implemented by a stylus provided by an embodiment of the disclosure.

FIG. 5 is a schematic diagram showing an operation of image information input implemented by a stylus provided by an embodiment of the disclosure. According to FIG. 5, a corresponding image information input process is as follows.

A user selects to add a marker or a signature on an electronic device 20.

The user utilizes the stylus to select a point where the marker or the signature will be sprayed, and then clicks a screen 201.

An information transmission module of the electronic device 20 transmits handshake information to a transmission module of the stylus, wherein the information transmission module of the electronic device 20 and the transmission module of the stylus both may be specifically a data transmission interface.

After the handshake information is received by the transmission module of the stylus, the transmission module of the stylus transmits image information stored in the stylus to a data transmission interface of the electronic device 20.

After image information data is received by the electronic device 20, the electronic device 20 displays the image information data at the location specified by the stylus to complete a display or spraying process of the image information.

Figure 6A:
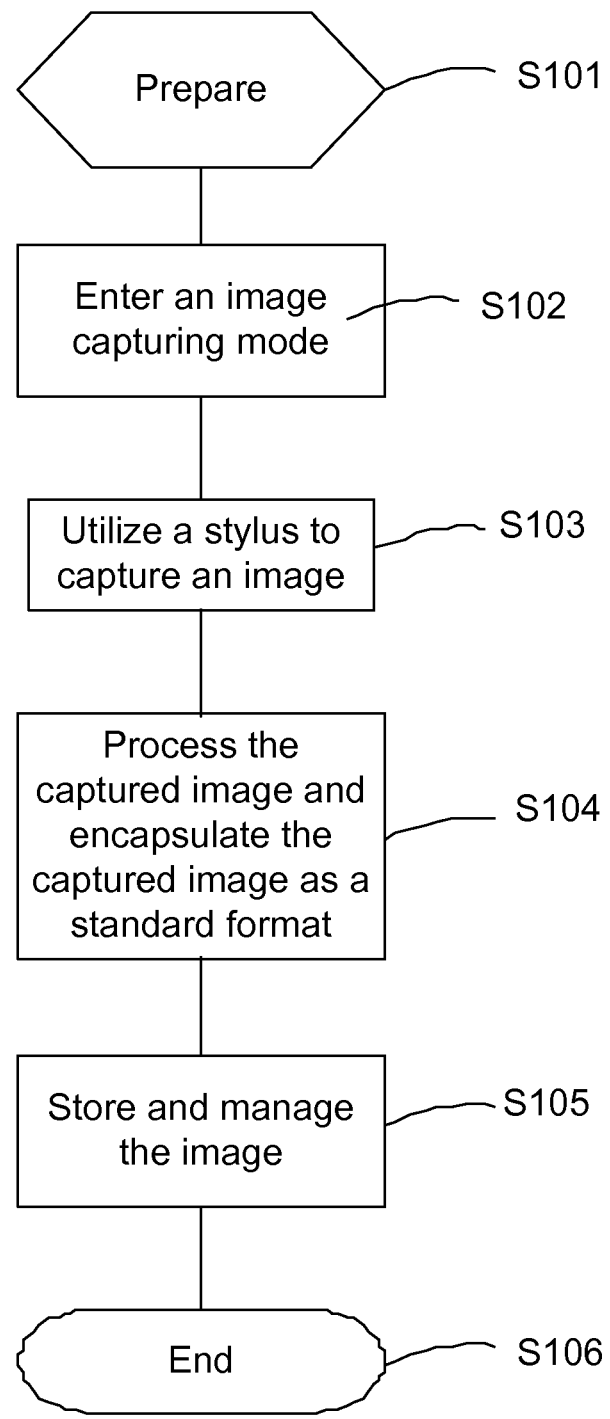
FIG. 6A is a flowchart of an image information pickup method provided by an embodiment of the disclosure.

FIG. 6A is a flowchart of an image information pickup method provided by an embodiment of the disclosure. As shown in FIG. 6A, the method includes the following steps:

Step 101: it is prepared;

Step 102: a user selects, on a certain interface of an electronic device, to enter an image capturing mode from an operation User Interface (UI) of the electronic device;

Step 103: when the image is still, the user utilizes a stylus to select an image area to be captured and to capture an image;

Step 104: the electronic device processes information of the captured image, and encapsulates the information as a standard image format;

Step 105: the image is stored in a storage module corresponding to the electronic device or the stylus in order to be called during subsequent input; and Step 106: it is ended.

Figure 6B:
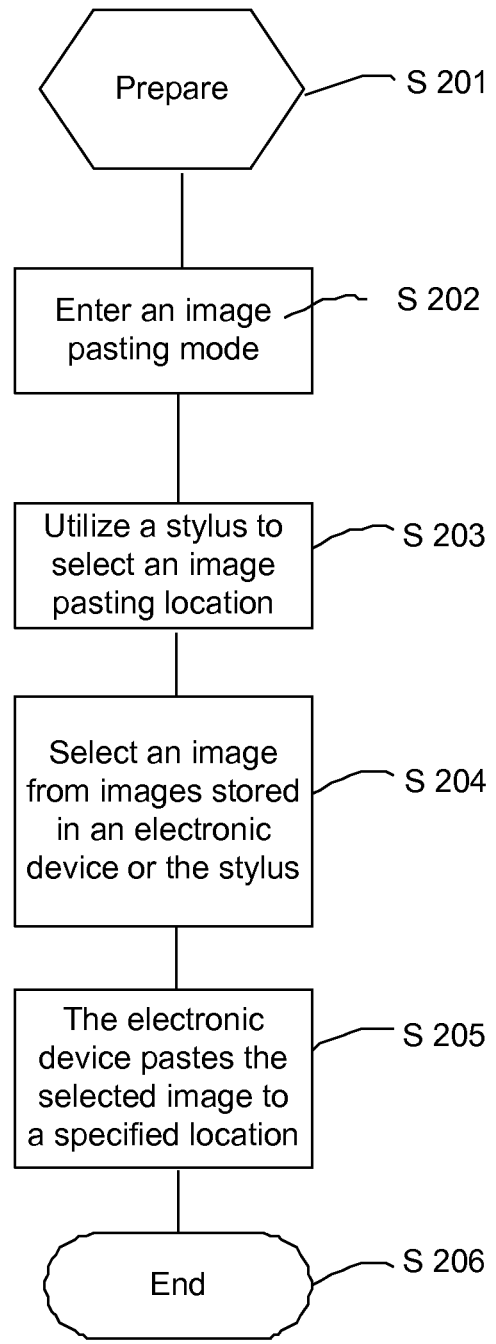
FIG. 6B is a flowchart of an image information input method provided by an embodiment of the disclosure.

FIG. 6B is a flowchart of an image information input method provided by an embodiment of the disclosure. As shown in FIG. 6B, the method includes the following steps:

Step 201: it is prepared;

Step 202: a user selects, on a certain interface of an electronic device, to enter an image pasting mode from an operation UI of the electronic device;

Step 203: a stylus is utilized to select a location where an image is to be pasted on the screen of the electronic device;

Step 204: captured images stored in the electronic device or the stylus are acquired, and an image to be pasted is selected from the captured images;

Step 205: the electronic device sprays the acquired image at the location selected by the stylus and stores the processing result; and Step 206: it is ended.

In the aforementioned specific implementation process of the embodiments of the disclosure, many operations are implemented via the electronic device. When a user utilizes the stylus to capture and input an image, if most of the operations can be implemented by the stylus and the user does not need to switch between the stylus and the electronic device, there will necessarily be better user experience.

Figure 7:
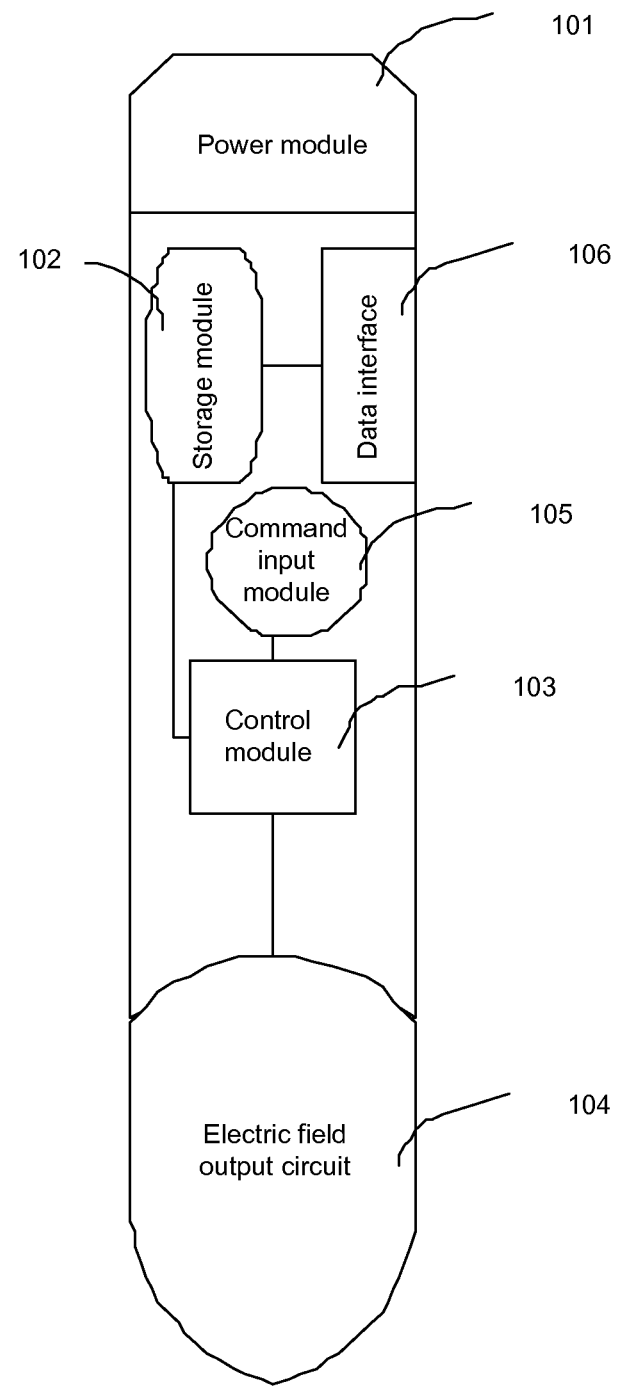
FIG. 7 is a schematic diagram showing a structure of a stylus provided by another embodiment of the disclosure.

In view of this, another embodiment of the disclosure provides a new information processing device, i.e., a stylus 10. FIG. 7 is a schematic diagram showing a structure of a stylus provided by another embodiment of the disclosure. As shown in FIG. 7, the stylus 10 includes: a power module 101, a storage module 102, a data interface 106, a command input module 105, a control module 103 and an electric field output circuit 104. The power module 101 is configured to supply necessary power to various parts of the stylus 10 via a battery, in a wired charging mode or in other modes.

The data interface 106 refers in particular to a USB interface in the embodiment, and is connected with the storage module 102 and is configured to transmit an image in an electronic device to the storage module 102 of the stylus 10 via a USB or in another way.

The command input module 105 is configured to provide a channel for inputting a command to a user, for example, the command input module 105 may include a plurality of operation buttons, may include an operation button for selecting an image from a memory and a control button for outputting an image to the electronic device, and even may also include a button for controlling the stylus 10 to start an image capturing operation.

The control module 103 is a central control unit of the whole stylus 10, and is mainly configured to: translate an operation of the command input module 105 into modulation information for signal transmission, and transmit the modulation information to the electric field output circuit 104; and encode a selected image according to an operation of the user and transmit the encoded image to the electric field output circuit 104.

The electric field output circuit 104 is configured to output electric fields corresponding to the modulation information and the encoded image transmitted by the control module 103 to a touch screen of the electronic device.

Image pickup and input processes of the stylus described in FIG. 7 on an electronic device are as follows.

The image pickup process is:

a user operates the stylus through operation buttons of the stylus to transmit information to a touch screen of the electronic device and to control the electronic device to capture an image, wherein the touch screen is a capacitive screen and includes a capacitance detection device; and after the image is captured by the electronic device, the electronic device transmits captured image information to the stylus through a data interface, and the stylus stores the captured image information.

The image input process is:

the user operates the stylus through operation buttons of the stylus to transmit corresponding information to the capacitance detection device of touch screen of the electronic device;

after the information is received by the electronic device, the electronic device prepares for processing, such as freezing a current image;

the stylus fetches corresponding image information from a storage unit of the stylus, and after the image information is modulated and encoded by a control unit of the stylus, the stylus transmits the processed image information to the electric field output circuit, and controls the electric field output circuit to transmit the corresponding image information to the capacitance detection device of touch screen of the electronic device;

the electronic device identifies the image information based on a change of the capacitance detection device of the touch screen; and the electronic device displays the acquired image information in a location specified by the stylus.

In the aforementioned embodiment, image information data of the electric field output circuit can be output either in a serial mode or in a parallel mode. The serial mode refers to: input is only made to a capacitance detection device and pixels are input one by one. The serial mode takes a long time, but a structure corresponding to the serial mode is simple, for example, the stylus can merely use a common stylus nib structure.

Figure 8:
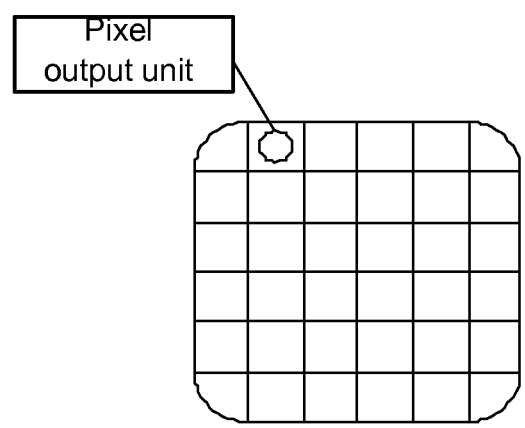
FIG. 8 is a schematic diagram showing a stamping face through which image information is input in a stamping way by a stylus provided by an embodiment of the disclosure.

The parallel mode is similar to stamping, as shown in FIG. 8. Namely, the part of the stylus for inputting image information data has a shape similar to a stamper. A stamping face of the stylus is divided into multiple pixel output units. The density of the pixel output units may refer to that of the capacitance detection device of touch screen of the electronic device. Therefore, when the stamp-like stylus is pressed on the screen of the electronic device, one pixel output unit can just correspond to one capacitive sensing device.

As shown in FIG. 8, after the stamping face of the stylus is pressed on the screen of the electronic and image information data are output, each pixel output unit is only responsible for transmitting image data in a small image area where the each pixel output unit is located to a corresponding capacitance detection device of the electronic device. The stylus collects the image data received respectively by the capacitance detection devices within the whole stamping area, arranges the image data to form a whole image, and displays the whole image, thereby greatly saving transmission time. In addition, operating experience is similar to the stamping, which fairly accords with a usage habit of users.

The above are only preferable embodiments of the disclosure, and are not intended to limit the scope of the disclosure. Any equivalent structure or flow transformation made using the content of the description and drawings of the disclosure, or direct or indirect application thereof to other related technical fields shall fall within the scope of protection of the disclosure similarly.

The invention claimed is:

1. An electronic device, comprising: a touch screen, a touch detection module, an information pickup area setting module, an information pickup module, an information transmission module, a storage module and an information display module, wherein
the touch detection module is configured to detect touch with the touch screen;
the information pickup area setting module is configured to set an information pickup area on the touch screen according to the touch;
the information pickup module is configured to pick up information in the information pickup area according to an information pickup command;
the information transmission module is configured to transmit the picked-up information to an information processing device;
the storage module is connected with the information pickup module and is configured to store the picked-up information; and
the information display module is configured to acquire information corresponding to an information input command from the information processing device and display the information in the information display area.

2. The electronic device according to claim 1, wherein the picked-up information is image information, and the electronic device further comprising: an image pre-processing module, which is connected between the information pickup module and the storage module and is configured to pre-process the image information, and send the pre-processed image information to the storage module.

3. The electronic device according to claim 1, wherein the information transmission module is a capacitance detection device which exchanges information with an electric field output circuit of the information processing device.

4. An information processing method for an electronic device with a touch screen, comprising:
detecting a first touch with a touch screen;
setting an information pickup area on the touch screen according to the first touch;
picking up information in the information pickup area according to an information pickup command, and storing the picked-up information;
detecting a second touch with the touch screen;
setting an information display area on the touch screen according to the second touch; and
fetching information corresponding to an information input command from the electronic device, and displaying the information in the information display area.

5. The method according to claim 1, wherein the information in the information pickup area is image information.

6. The method according to claim 5, further comprising: before the picked-up information is stored,
performing image pre-processing on the image information.

7. The method according to claim 6, wherein the image pre-processing comprises more than one of followings: image compression processing, image binarization processing, gray level processing on an image and edge-directed image processing.

8. An electronic device, comprising: a touch screen, a touch detection module, an information pickup area setting module, an information pickup module, a storage module and an information display module, wherein
the touch detection module is configured to detect touch with the touch screen;
the information pickup area setting module is configured to set an information pickup area on the touch screen according to the touch;
the information pickup module is configured to pick up information in the information pickup area according to an information pickup command and store the picked-up information;
the storage module is configured to store the picked-up information; and
the information display module is configured to fetch information corresponding to an information input command from the electronic device and display the information in the information display area.

9. The electronic device according to claim 8, wherein the picked-up information is image information, and the electronic device further comprising: an image pre-processing module, which is connected between the information pickup module and the storage module and is configured to pre-process the image information, and send the pre-processed image information to the storage module.

10. An information processing method for an electronic device with a touch screen, comprising:
detecting a first touch with a touch screen;
setting an information pickup area on the touch screen according to the first touch;
picking up information in the information pickup area according to an information pickup command;
transmitting the picked-up information to an information processing device;
detecting a second touch with the touch screen;
setting an information display area on the touch screen according to the second touch;
receiving information from the information processing device; and
displaying the received information in the information display area.

11. The method according to claim 10, wherein the information in the information pickup area is image information.

12. The method according to claim 11, further comprising: before the picked-up information is stored,
performing image pre-processing on the image information.

13. The method according to claim 12, wherein the image pre-processing comprises more than one of followings: image compression processing, image binarization processing, gray level processing on an image and edge-directed image processing.

14. An information processing device for an electronic device with a touch screen, comprising: a power module, a command input module, a control module, a transmission module and a storage module, wherein
the power module is configured to supply power for the command input module, the control module, the transmission module and the storage module;
the command input module is configured to input a user command;

the control module is configured to control the transmission module and the storage module in response to and in accordance with the user command;

the transmission module is configured to exchange information with the electronic device under control of the control module; and the storage module is configured to store the information.

15. The device according to claim 14, wherein the transmission module comprises: a data interface, configured to acquire information from the electronic device.

16. The device according to claim 15, wherein the transmission module further comprises: an electric field output circuit, configured to exchange information with a capacitance detection device of the electronic device.

17. The device according to claim 16, wherein the transmission module further comprises: a pixel output unit, configured to transmit the information exchanged with the capacitance detection device in a serial data transmission way or a parallel data transmission way.

* * * * *